United States Patent Office 3,468,986
Patented Sept. 23, 1969

1

3,468,986
METHOD FOR PRODUCING A SOLID
PARTICULATE MATERIAL
David J. Watanabe, 748 E. Glendora Ave.,
Orange, Calif. 92667
No Drawing. Continuation-in-part of application Ser. No.
300,060, Aug. 5, 1963. This application Nov. 15, 1966,
Ser. No. 594,396
Int. Cl. B22d 23/08
U.S. Cl. 264—9                                        16 Claims

ABSTRACT OF THE DISCLOSURE

A method for forming discrete solid particles of a meltable substance in which the substance is first melted and then dispersed in a nonsolvent liquid maintained at a temperature above the solidification temperature of the meltable substance, and thereafter the dispersion is cooled to solidify the dispersed droplets into discrete solid particles of the meltable substance. The dispersion of the meltable substance in nonsolvent liquid can be formed by agitating a mixture of these materials, or by injecting a stream of the molten substance into a flowing body of the nonsolvent liquid.

---

This application is a continuation-in-part of application Serial No. 300,060, filed Aug. 5, 1963, now Patent No. 3,316,965.

This invention relates to the production of solid particulate material, and particularly to the production of solid particles from a molten or solidifiable liquid mass. More specifically, the invention relates to a method for forming a solidifiable molten material into substantially spheroidal solid beads of relatively uniform small size. Further, this invention concerns a novel method of making spheroidal hydrocarbon-polymer particles.

It is often necessary to convert bulk quantities of a molten substance, or of a substance which can be melted, into finely divided solid particles of substantially spheroidal shape and relatively uniform small size. In particular, need exists for means to convert bulk quantities of various hydrocarbon-polymer compositions into substantially spheroidal particles of relatively uniform small size for use as temporary sealing or plugging agents, propping agent spacers, viscosity increasers, fluid loss additives and selective permanent plugging agents useful in the drilling of oil and gas wells and in treating subterranean petroleum producing formations. Heretofore, it has been necessary to accomplish the required particulation by molding, prilling, spray drying, extruding, shredding, disintegrating, and the like. However, these techniques are not wholly satisfactory and have obvious disadvantages in terms of high capital and operating costs, material waste, poor efficiency, and/or low production capacity.

Accordingly, it is an object of the present invention to provide an improved method for producing solid particulate material. Another object of the invention is to provide an improved method for producing finely divided solid spheroidal particles of a meltable substance. Another object of the invention is to provide a method for forming a molten liquid into substantially spheroidal solid particles of relatively uniform size. Still another object of this invention is to provide an improved method for producing spheroidal hydrocarbon-polymer particles. A further object of this invention is to provide a method for producing solid particles of a homogeneous mixture of wax and polymer. A still further object of this invention is to provide a method for converting a bulk quantity of a solidifiable hydrocarbon-polymer composition into finely divided solid beads of substantially spheroidal shape and relatively uniform size useful in the drilling of wells and in treating subterranean oil and gas producing formations. These and related objects will be apparent to those skilled in the art from the following description.

Briefly, in accordance with the method of this invention, finely divided solid particles of a solidifiable material can be produced from a molten liquid mass of this material by forming a dispersion of the molten liquid in a body of nonsolvent liquid maintained at a temperature above the solidification temperature of the dispersed material, and then cooling the dispersion to solidify the dispersed material. In a preferred embodiment, the dispersion can be continuously produced by injecting a small stream of the molten liquid through an injection nozzle and into a body of nonsolvent liquid flowing past the injection nozzle at a velocity sufficient to shear the injected material from the nozzle tip in small droplets. The nonsolvent liquid containing the dispersed droplets of injected material is passed into a quiescent zone to facilitate formation of the droplets into a spheroidal shape prior to solidification. The spheroidal droplets of dispersed molten liquid are solidified by admixing the dispersion with a further volume of cold nonsolvent liquid, an initial portion of which is preferably introduced tangentially into the quiescent zone. The size and shape of particles formed in the foregoing manner can be largely controlled by proper adjustment of the processing conditions. After solidification, the solid particles can be recovered from the nonsolvent liquid by conventional screening and drying, where a dry product is desired. Further, the dry solid particles can be classified into desired size ranges.

Broadly, the method of this invention can be employed to particulate any meltable substance which can be solidified on subsequent cooling and for which a suitable nonsolvent liquid is available. More specifically, the invention has particular utility in producing small, substantially spheroidal particles of various blends of hydrocarbon and polymer. In particular, the method is adapted to producing finely divided spheroidal beads of a homogeneous mixture of wax and polymer having a relatively uniform small size, and which are useful in the drilling of oil and gas wells and in the treatment of subterranean petroleum producing formations. Compositions useful for these purposes, and which can be particulated by the method of this invention, are disclosed in copending application Serial No. 300,060, filed Aug. 5, 1963, now Patent Number 3,316,965, and include various compositions comprising addition polymers and liquid or solid hydrocarbon.

In the production of a particulated solid, such as the aforementioned hydrocarbon-polymer particles, one technique of manufacture comprises subdividing a solidifiable material, such as a hydrocarbon-polymer blend, in the molten state within a body of a nonsolvent liquid such as water which can, but need not, contain a finely divided coating solid. It is important that the nonsolvent liquid not contain any material capable of forming stable collodial dispersions or emulsions of the hydrocarbon-polymer blend when violent agitation is used for subdivision. The subdivided molten material, maintained in constant movement while cooling below its solidification temperature, usually assumes a particle shape of minimum surface, i.e., a spheroid. Cooling or quenching of the subdivided hydrocarbon-polymer material can be carried out in any convenient manner, but usually comprises the introduction of large amounts of additional, cool nonsolvent liquid to the subdivided particles dispersed in the original body of nonsolvent liquid.

It is found in hydrocarbon-polymer blend subdividing operations using violent agitation, i.e., stirring, pump mixing, etc., that it is necessary to have present in the nonsolvent liquid a suspension of a finely divided solid such as calcium carbonate which uniformly distributes itself over the surface of the spheroids as they form, thus providing a coating for the hydrocarbon-polymer spheroid particles. This coating of fine solids prevents subsequent coalescence of particles subdivided by violent turbulent agitation as with stirrers, colloid mills, pump mixers, and the like. The coating also minimizes agglomeration while cooling to a point below the melting point of the hydrocarbon-polymer blend, and further prevents adhesion of the spheroids during subsequent handling of the solid particles in manufacture and storage.

The nonsolvent liquid within which the hydrocarbon-polymer blend is dispersed or subdivided in accordance with the previously described spheroid manufacture can be any liquid in which the hydrocarbon-polymer blend is both essentially immiscible in the molten phase and substantially insoluble in the solid phase. Preferably, such nonsolvent dispersing liquid has a normal boiling point substantially above the melting point of the hydrocarbon-polymer blend, but liquids normally boiling lower than the hydrocarbon-polymer blend can also be used. When substantially lower boiling liquids are used, the hydrocarbon-polymer blend dispersion can be carried out under superatmospheric pressures. Water is preferred as the nonsolvent liquid for hydrocarbon-polymer dispersion, but any other liquid meeting the requirements set forth above is satisfactory and these other liquids can be either utilized alone or when compatible in admixture with water. Other nonsolvent liquids include such organic liquids as glycols, highly polar hydrocarbons, and the like which are particularly usable when the plugging or sealing material being manufactured is a wax-polymer blend. A prefered temperature for water as a nonsolvent liquid for use in the dispersion of wax-polymer blends is in the range of about 200°±10° F. The volume of nonsolvent liquid utilized can be of any volume which provides a sufficient body of liquid for dispersion of the subdivided hydrocarbon-polymer blend therein and usually is at least equal to the hydrocarbon-polymer blend volume. Preferably, the volume of nonsolvent liquid employed for dispersion is considerably greater than the volume of hydrocarbon-polymer blend, e.g., from 2 to 25 times larger.

The spheroidal particles, coated or uncoated, separate readily from the nonsolvent liquid as a particulate spheroidal solid phase and can readily be packaged for subsequent use. The material can be either dried by draining, which forms a relatively high moisture blend product but which, nevertheless, does not agglomerate or otherwise have characteristics which hinder its handling. However, the spheroidal blend particles can be dried by forced air or any other conventional means of drying or moisture removal to provide a substantially moisture-free product which is also free flowing and nonagglomerating.

According to one mode of manufacture of the preferred spheroidal particles, the nonsolvent dispersing liquid is heated to a blending temperature substantially above the melting points of the components of the hydrocarbon-polymer blend, e.g., such melting points for wax-polymer blends being typically in the range from about 300° F. to about 450° F. However, depending on the hydrocarbon and polymer components, this blending temperature can be substantialy higher or lower than this typical range. The melted blend is then added to the hot nonsolvent dispersing liquid body, and the mixture is vigorously stirred as with a propeller stirrer or otherwise subjected to dispersion by violent turbulent agitation e.g., colloid mill, homogenizer, and the like, until the introduced blend is split into small droplets or particles. The size of the hydrocarbon-polymer blend particles in this method of manufacture is largely dependent upon the nonsolvent liquid and the particular agitation equipment employed to perform these steps.

Without interrupting the violent agitative stirring, the finely divided coating solid is then added and stirring is continued for several minutes until the appearance indicates that the molten hydrocarbon-polymer droplets have become coated with the solid. The mixture of hydrocarbon-polymer particles, nonsolvent liquid, and coating solid is then allowed to cool or quench by the addition of cool nonsolvent liquid or by other heat dissipating means whereupon the coated hydrocarbon-polymer droplets solidify to form a multitude of individual nonagglomerating solid hydrocarbon-polymer particles. Typically, with water as the quenching liquid, the temperature range preferred is from about 100° F. to about 150° F. for wax-polymer blends, the particular temperature chosen being dependent upon the melting point of the wax-polymer blend. The solid hydrocarbon-polymer particles are then separated from the nonsolvent liquid. If desired, traces of nonsolvent liquid on the particles can then be removed by draining, air drying, centrifuging, or other methods of moisture removal. Alternatively, the spheroids can be maintained in suspension with the nonsolvent dispersing liquid, e.g., water, and pumped to storage or other use. Storage of these blend spheroids in a nonsolvent fluid suspension provides convenient handling with minimum cost. An alternative mode of coating the hydrocarbon-polymer solids comprises adding the finely divided coating solids to the body of nonsolvent liquid prior to the addition of the molten hydrocarbon polymer blend. Also, if desired, the hydrocarbon-polymer composition can be introduced into the nonsolvent liquid in solid form, the mixture then heated to melt the blend and the mixture stirred with the finely divided dispersing solid being added in one of the manners above-described.

In the production of the spheroidal hydrocarbon-polymer particles preferably used in the treating processes of this invention, it has been found that the use of finely divided coating solids suspended in the nonsolvent liquid dispersing medium is not necessary, particularly when using my preferred angular injection dispersion method, hereinafter discussed. When finely divided coating solids are used, then the finely divided solid material should be substantially insoluble in both the nonsolvent liquid and the hydrocarbon-polymer blend, and furthermore should be a solid material which does not promote the formation of emulsions, foams, or colloidal dispersions. This finely divided solids parting or nonagglomerating agent can be a salt of any of the metals of Groups II, III, IV–A, V, VI, VII, and VIII of the Periodic Table. Examples of such metals include barium, lead, calcium, iron, chromium, and the like, and examples of the salts include barium sulfate, lead sulfate, calcium carbonate, ferric carbonate, chromium sulfide, calcium sulfate, and the like. Also the oxides and hydroxides of these metals, e.g. calcium oxide, calcium hydroxide, magnesium hydroxide, zinc hydroxide, aluminum oxide, ferrous hydroxide, cupric hydroxide, strontium hydroxide, ferric hydroxide, zinc oxide, cobalt oxide, vanadium oxide, titanium dioxide, manganous hydroxide, chromium hydoxide, and the like can be used. Particularly preferred for use in coating the hydrocarbon-polymer treating materials of this invention is calcium carbonate, e.g., a commercial calcium carbonate such as Purecal U which has a particle size range of from about 0.033 microns to about 0.040 microns or Purecal M which has a particle size range of from about 0.10 microns to about 0.35 microns. Other finely divided coating solids which can be used include clay, bentonite, kaolin, Fuller's earth or other aluminum silicates, limestone, and crushed oyster shells. Furthermore, organic solids which have the required characteristics for a finely divided solid coating or parting agent can be used, e.g., synthetic resins such as polystyrene, polyethylene, polyvinyl acetate, cellulose acetate, and the like.

The particle size of the finely divided solid coating material for the above-described particle manufacturing technique can be any particle size which can be sufficiently suspended in the nonsolvent liquid dispersing medium by agitation, stirring, or otherwise so as to provide a finely divided solid cloud for the hydrocarbon-polymer particles to pass through. The finely divided coating solid can be suspended in the hot nonsolvent liquid stream in which the hydrocarbon-polymer melt is first dispersed, or in a modification of my spheroid manufacture the finely divided solids can be suspended in the cooling or quench zones of the spheroid manufacturing process, i.e., subsequent to the subdivision of the hydrocarbon-polymer melt. Particle sizes of this finely divided coating solid in the range of 100 mesh U.S. sieve or smaller are particularly suitable, e.g., from about 100 mesh to about 0.02 microns, but particle sizes both substantially larger and substantially smaller are suitable.

The amount of finely divided coating or parting solid employed can be varied over a wide range. It is found that the addition of any amount of finely divided coating solids to the nonsolvent liquid dispersing medium provides some nonagglomerating characteristics during manufacture and improved storage and handling characteristics for all of the hydrocarbon-polymer blend compositions of my invention. In proportion to the nonsolvent liquid dispersing medium, the finely divided coating solids will usually comprise from about 0.5 percent to about 30 percent of the weight of the nonsolvent liquid. It has been found, for example, that for hydrocarbon-polymer spheroids subjected to high temperature storage, a preferred amount of finely divided coating solids suspended in the nonsolvent liquid is between about one percent and about ten percent of the weight of the nonsolvent liquid, the particular percentage used depending upon the particle size of the finely divided solid, the compositional nature of the hydrocarbon-polymer blend, the characteristics of the nonsolvent liquid, and the ratio of nonsolvent liquid to hydrocarbon-polymer blend.

However, although the foregoing method can be used with success, particularly in producing small quantities of product, a particularly preferred method of continuously manufacturing a particulated solid employs a novel particle parade or particle isolation technique utilizing injection of the fluid blend into a flowing nonsolvent fluid body, which method has many significant advantages over prior techniques of hydrocarbon-polymer spheroid manufacture. Among these advantages are substantially uniform spheroidicity and size of the manufactured beads; ease of size control of the spheroid particles; lack of particle agglomeration during manufacture, either with or without the use of a finely divided coating solid; and simplicity of process apparatus and operation. The preferred bead or speroid manufacturing process of my invention essentially comprises melting the hydrocarbon-polymer blend and injecting the molten blend into a moving stream of hot nonsolvent liquid, the nonsolvent liquid being preferably heated to a temperature above the melting point of the blend, whereby the force of the nonsolvent stream separates portions of the blend stream into discrete blend particles.

The axis of injection of the molten blend, preferably flowing at a relatively high velocity into the moving nonsolvent liquid stream, is preferably located at an acute angle relative to the flow axis of the moving nonsolvent stream. This angular blend injection is preferably in an upward direction into a horizontally moving nonsolvent liquid stream, i.e., for best results the hydrocarbon-polymer melt should not be injected at an angle downwardly into the moving stream. Furthermore, while any transverse injection such as vertical or perpendicular injection is operable, other injection systems are not usuallly as satisfactory as the aforesaid acute angular injection. Preferably also, where the axis of angular blend injection intersects the axis of the nonsolvent liquid stream, the hydrocarbon-polymer blend stream has a flow velocity component in the same direction as the direction of flow of the hot nonsolvent stream. The acute angle between the axis of these two intersecting streams, i.e., nonsolvent liquid and hydrocarbon-polymer blend, is preferably any angle substantially less than 90°, and particularly preferred are those angles between about 15° and about 75°, with a particularly efficacious and convenient angle of injection occurring at about 45°. However, any injection transverse to the axis of flow of the nonsolvent stream can be operable in producing particle isolation.

The particle size of the spheroids formed by my particle isolation method of dispersion can be conveniently varied in mean diameter by controlling a number of the process and apparatus variables. It is also found that substantially uniform sized particles can be made using my preferred particle isolation technique, i.e., a relatively narrow range of particle sizes such as from 4 mesh to 20 mesh US sieve. The injection velocity of the hydrocarbon-polymer blend into the hot nonsolvent dispersing liquid, of course, controls the frequency at which a suitable mass of the hydrocarbon-polymer blend is available for shearing or stressing by the hot nonsolvent liquid stream. The velocity of the stream of hot blend. The particle size is also critically influenced by blend is injected determines the shearing force and/or tensive force available for separating individual particles from the incoming flow stream of hydrocarbon-polymer blend. The particle size is also critically influenced by the angular injection since the size of the injecting orifice formed by the conduit opening through which the hydrocarbon-polymer blend is introduced into the body of nonsolvent liquid, in combination with the angle of injection as previously discussed, controls the volume of hydrocarbon-polymer blend exposed to a buoyancy effect which is related to the relative specific gravities of the hydrocarbon-polymer blend and the nonsolvent liquid. By buoyancy effect I mean the tendency of my typical hydrocarbon-polymer blends to rise, because of differences in specific gravity, through a body of nonsolvent liquid. Other factors influencing spheroid size include the temperature and composition of the hydrocarbon-polymer blend being injected since the viscosity is both temperature and composition dependent and viscosity is partially determinative of the shearing force and tensive force required for spheroid particle formation by my flowing stream technique of subdivision and particle isolation. Generally then, my particle isolation technique is operative in any system or arrangement where the shearing force and tensive force applied by the force of the flowing nonsolvent stream to the incoming blend stream is sufficient to disperse discrete substantially uniform portions of the blend stream at substantially uniform intervals into the nonsolvent stream.

Although it is not completely understood why my preferred angular injection in the particle isolation dispersion method of this invention produces such a controllably superior spheroidal product, it is believed that some of the major factors are those set forth above. I have further found that when the injecting orifice is connected by means of a vertical conduit to the bottom of a horizontal conduit carrying a flowing stream of nonsolvent liquid, the spheroidal blend product formed is less satisfactory than with angular injection in that apparently the intrinsic buoyancy of the hydrocarbon-polymer material permits it to rise into the nonsolvent liquid flowing stream in large random-sized masses, thus producing large agglomerates of a less satisfactory degree of spheroidicity and size uniformity. Furthermore, when the injection conduit is entering from either an angle or a perpendicular above the horizontal nonsolvent liquid conduit, it is found that again the product formed is less satisfactory and the spheroidal and nonagglomerating nature of the product is reduced. However, when the blend is introduced at an angle from below into a horizontal flowing nonsolvent liquid stream, I have found that the wedge of hydrocarbon-polymer blend which is exposed to the flowing stream at any instant has an intrinsic buoyancy which contributes to a controllably uniform spheroidal particle shape and size.

Although the particle size range of particular interest to this invention, i.e. from about ¼ inch mean diameter to about 100 mesh US sieve, is conveniently made with my angular injection system, any spheroidal particle size can be made with my apparatus, e.g. hydrocarbon-polymer spheroids one inch and more in diameter can be readily produced as well as spheroids as small as 300 mesh US sieve and smaller. These very large and very small hydrocarbon-polymer spheroids, when coated with a dispersing or parting agent, all have the advantageous storage, packaging, transporting, and handling characteristics hereinabove discussed with relation to the intermediate spheroid sizes, i.e., from 4 mesh to 100 mesh US sieve.

I have found that the use of a dispersing or coating solid with my particle isolation blend dispersion method is not required, and particle dispersion with formation of nonagglomerating spheroids takes place in the nonsolvent liquid containing no dispersing or coating agent whatsoever. The spheroid particle parade which occurs in my blend injection apparatus and method minimizes the need for a parting agent during spheroid formation and/or cooling. Thus, the particle separation inherent in my hydrocarbon-polymer blend injection technique of dispersion provides individually created particles which are continually isolated by the flow of hot nonsolvent liquid. Thus, my particular blend injection, in combination with my particle parade, induces separation during cooling and quenching and provides solid particles, coated or uncoated, which have no tendency to agglomerate at room temperature. However, it is often desirable to use a finely divided solid dispersing or coating agent and the method of operation set forth herein is completely operable using the finely divided coating solids as previously discussed in relation to other methods of bead manufacture.

The dispersed or subdivided particles produced by my particle isolation by blend injection can be cooled and/or quenched and then removed from the nonsolvent liquid medium in the same manner previously discussed in relation to other methods of manufacture. The nonsolvent liquid is usually recirculated in the process as is the finely divided dispersing or coating solid when used. A preferred method of cooling and quenching the hydrocarbon-polymer particles is to allow the sequentially parading stream of freshly subdivided hydrocarbon-polymer particles, now somewhat spheroidal in shape although still molten or semi-molten, to pass into a cooling and/or quenching zone wherein the particles are cooled to a temperature level where they become solids. One preferred system comprises allowing the particles to rise individually by their natural buoyancy through a relatively slow nonsolvent liquid velocity residence vessel or tank where their individual velocities are substantially reduced from the hydrocarbon-polymer particle velocity existing at the time of subdivision (blend injection). A cooling jet of liquid is preferably introduced into this residence vessel or accumulator tube in such a manner as to not interfere either with the particle isolation during cooling or with the upward buoyant velocity of the spheroidal particles, yet provide a substantial cooling or quenching effect by dilution of the original hot nonsolvent liquid with cooler nonsolvent liquid. A tangential nonsolvent liquid jet giving a slight vortex action to the fluid in the upper portion of the residence vessel is particularly satisfactory.

It is to be understood that a multiplicity of injection systems can be used, either using a common hot nonsolvent flow line with multiple blend injection points in the single common flow line or using multiple nonsolvent flow lines, each having its own blend injection line. When multiple blend injection systems are utilized, the cooling and quench systems can be common to all the multiple blend injection operations or each injection system can have its own individual cooling and quenching system. As many as sixteen blend angular (45°) injection points have been operated simultaneously with an overall spheroid production rate, 4 mesh to 100 mesh U.S. sieve, of about 40,000 pounds per month on an 8 hour per day operational basis.

The improved method of this invention is demonstrated by the following examples which are presented by way of illustration, and are not intended as limiting the spirit and scope of the invention as defined by the appended claims.

EXAMPLE I

Wax and polymer materials were mixed and melted in a large melt tank, the tank being indirectly heated with hot oil and having both paddle agitation and recirculation pump stirring, as the first step in making wax-polymer spheroidal particles. The first component was 33 slabs of a 130°/134° petroleum base paraffin wax comprising about 367 pounds which was 53% of the total blend by weight. The second component was 21 slabs of a 143°/150° petroleum base paraffin wax comprising about 233 pounds which was 33% by weight of the final blend. The third and final component was "Elvax 240," an ethylene/vinyl acetate copolymer comprising about 100 pounds which was approximately 14% of the total weight of the blend. Thus, the total wax-polymer blend comprised about 700 pounds. The molten wax-polymer blend was pumped from the melt tank in steam traced piping and was injected through a ¼-inch I.D. line at a 45° angle at a rate of about 0.7 pound/min. into the bottom of a horizontal ¾-inch standard pipe containing a hot aqueous calcium carbonate solution at a temperature of about 205° circulating at a rate of about 1.69 gallons per minute. The hot water nonsolvent dispersing medium contained about 10 pounds of finely divided $CaCO_3$ (Purecal M) per 100 gallons of tap water. The temperature of the wax was in the range of 220° F.–225° F. when injected. The angle of blend injection was such that the horizontal velocity of the blend stream was in the same direction as the direction of flow of the water stream in the ¾-inch pipe. The beads, after being dispersed in the hot calcium carbonate nonsolvent medium flowing in the ¾-inch pipe, were passed to a quench zone comprising a vertical residence vessel and thence passed to a cooling tank where a large warm water reservoir was used to complete the cooling of the beads. The vertical residence vessel had a diameter of about 5 inches and a length of about two feet. The cooling water was kept at a temperature of about 110° F.±5° F. in the warm water reservoir which was a galvanized can having a volume of about 50 gallons.

The production of substantially uniform spheroids (beads) was accomplished producing a mesh range of spheroidal particles generally running as tabulated below:

Mesh (U.S. sieve): Percent by weight retained
+12 ............................................ 45.3
+16 ............................................ 37.2
+20 ............................................ 13.5
+30 ............................................ 3.1
+40 ............................................ 0.3
Less than 40 ................................ 0.6

The beads formed were extremely uniform and those beads in the +12 mesh size range had a majority in the general range of about 4 to about 10 mesh U.S. sieve. The spheroidicity of the particles was not only excellent, but these particles were thoroughly coated with calcium carbonate and demonstrated excellent handling and packing characteristics at even elevated temperatures (130° F.) near the softening point.

When the above spheroid production run was performed in exactly the same manner as previously described except that the nonsolvent dispersing medium was free of solids, the beads formed were substantially of the same excellent quality, uniformity, and mesh size as previously made with the finely divided CaCO₃ coating solid. Thus, in the absence of the finely divided calcium carbonate, wax-polymer spheroids were produced in bulk quantities with no particle agglomeration during manufacturing. However, these spheroids which were produced without a finely divided parting solids coating did not have as good packing or transport characteristics at elevated temperatures as the coated beads. This second run without a coating solid clearly illustrates the ease of manufacture of spheroidal pellets, in the absence of the previously mandatory finely divided dispersing solid, when the apparatus and methods of my angular blend injection with particle parade are used.

Further production runs of the same blend as above were made with calcium carbonate (Purecal M) concentrations of about 1 and 5 pounds of solids per 100 gallons of water. These runs conveniently produced a completely satisfactory nonagglomerating bead product which had excellent packing and transporting characteristics even at high temperatures (130° F.).

EXAMPLE II

Using the apparatus and techniques as set forth in Example I, except as set forth below, a blend was made of 165 pounds of 143°–150° petroleum base paraffin wax with about 29 pounds of Elvax 240 (ethylene-vinyl acetate copolymer). The blend, at a temperature of about 220° F., was injected at a rate of about 0.7 pounds per minute into the hot (about 210° F.) aqueous dispersion medium containing about 10 pounds per 100 gallons water of CaCO₃ (Purecal M), flowing in the ¾-inch pipe at a rate of about 1.7 gallons per minute. Quenching was conducted as set forth in Example I with no particle agglomeration or sticking taking place during manufacture. The particles (spheroidal beads) formed were substantially of the same particle size range as those made in Example I with the bulk of the beads running between about 4 and 10 mesh. This material had a softening point of about 145° F. and a melting point of about 160° F. The more similar batches of this hydrocarbon-polymer were converted into beads as above with substantially the same results.

EXAMPLE III

Using the production apparatus and technique as set forth in Example I, a blend was made of 165 pounds of 165° F. petroleum base paraffin wax with about 29 pounds of Elvax 240 (ethylene-vinyl acetate copolymer). The hydrocarbon-polymer blend, at a temperature of about 235° F., was injected at the 45° angle of Example I and at a rate of about 0.7 pounds per minute into a hot (about 200° F. to 210° F.) aqueous dispersion medium, containing 5 to 10 pounds of calcium carbonate (Purecal "M") per 100 gallons water, flowing in the ¾-inch pipe at a rate of about 1.7 gallons per minute. Quenching was carried out as set forth in Example I with no particle agglomeration or sticking. The spheroid beads were substantially of the same particle size range as those made in Example I with the bulk of the beads running in particle size between about 4 mesh and 10 mesh US sieve. This material had a softening point of about 165° F. and a melting point of about 185° F.

In a modification of this run, the blend injection angle was changed to a 90° bottom entry, thus perpendicular to the direction of flow of the hot calcium carbonate nonsolvent dispersing fluid. A second batch of the same weight and composition as above was then run in the same manner as above except for the different angle of blend injection. The beads made were very small or very large with no uniformity in bead size or shape. Many of the beads had long tails or were odd shaped. Also, the flow of the wax-polymer blend was difficult to control as compared to the 45° injection angle previously used. When the 90° entry angle injection pipe was connected to the horizontally flowing calcium carbonate stream from above, instead of from below, the same somewhat erratic results were obtained in a third run repeating the above manufacture.

EXAMPLE IV

In this example, a high melting wax-polymer blend was made into beads using the conventional laboratory dispersion technique. Thirty grams of a 165° F. petroleum base paraffin wax was melted in a 500 ml. beaker and heated to about 250° F. Thirty grams of Dow Experimental Resin X–3488.2 (ethylene-ethyl acrylate copolymer) was melted in a separate beaker by heating to about 350° F. The wax and polymer were then mixed and heated while stirring with a glass rod until the temperature of the blend was about 385° F. About 1,000 ml. of water was then put in a 2,000 ml. beaker with about 100 grams of Purecal U (finely divided calcium carbonate) and the mixture stirred with an electrically driven propeller stirrer while heating to boiling. The wax-polymer blend was then added slowly to the hot stirred calcium carbonate solution. The wax-polymer material readily dispersed forming small, somewhat irregular balls. The entire mixture was then cooled or quenched by adding two heaping handfuls of crushed ice to the 2,000 ml. beaker. The wax-polymer balls were separated from the aqueous calcium carbonate nonsolvent dispersing medium and air dried. The wax-polymer bead product formed was tough, yet deformable and had excellent storage and transporting characteristics with no agglomeration at temperatures as high as 130° F. This material had a softening point of about 180° F. and a melting point of about 200° F.

EXAMPLE V

A fifty-fifty blend by weight (100 grams each) of 300 neutral oil and Dow Experimental Resin X–3488.2 ethylene copolymer (ethylene and ethyl acrylate) was heated to 400° F. in a 500 ml. beaker to form a homogeneous molten hydrocarbon-polymer blend. The molten mixture was then poured into a 1,000 ml. beaker containing water at 212° F. with finely divided calcium carbonate solids present as a dispersing agent. The hot nonsolvent liquid (water) in the beaker was agitated with a propeller stirrer during the addition of the hydrocarbon-polymer blend and spheroidal particles were quickly formed. The contents of the beaker were then quenched with a heaping handful of crushed ice and the hydrocarbon-polymer beads were separated from the water phase. The spheroidal beads formed were generally uniform in geometry, but contained many odd shaped beads and many particles with tails as is typical of particles formed in batch turbulent agitation dispersion. The particle size distribution was similar to that found in most methods of bead manufacture, i.e., from about 20 to about 100 mesh US sieve. The beads were deformable, yet quite tough and resilient, resembling a soft rubber in general texture and consistency. The particles were nonagglomerating and had satisfactory shipping and storage characteristics for commercial use, but there was a substantial amount of oil sweating which became apparent upon extended storage. A second blend was manufactured exactly in the manner set forth above except a 90 neutral oil was substituted for the 300 neutral oil and the resulting particles were substantially the same as those made with 300 neutral oil.

EXAMPLE VI

A further 200 gram light hydrocarbon oil-polymer blend was made using 50% by weight Dow Experimental Resin X–3488.2 ethylene copolymer (ethylene and ethyl acrylate) and 50% by weight 150 bright stock blending oil. Beads were formed in the same manner as described in Example V. After about 24 hours of storage at room temperature, there appeared to be a slight sweating of oil from the beads made in the example which kept the bead surface oily. When these beads, formed from light hydrocarbon oils, are made in my continuous particle isolation injection system, previously described in Example I, and are made without a dispersing agent such as calcium carbonate being used in the nonsolvent liquid, the oil bead product does not agglomerate or coalesce at ambient temperatures. Particularly with the low molecular weight hydrocarbon oils used in Example V and this Example, the oily film which bleeds or sweats from the spheroidal particles keeps the particles separated or lubricated therebetween thus apparently eliminating any agglomeration at room temperatures.

EXAMPLE VII

Another blend (by weight) was prepared from 70% kerosene and 30% Dow Experimental Resin X–3488.2 (a copolymer of ethylene and ethyl acrylate) and beads were made in the same manner as described in Example V. These beads were tough, flexible, soft yet rubber-like, and while readily deformable they retained a substantially spheroidal shape during packaging, handling, and the like. Furthermore, these coated beads remained dry upon storage and exhibited none of the oil sweating of Examples V and VI. It is believed this is related to the straight chain nature of the hydrocarbons in kerosene which produces an essentially homogeneous hydrocarbon-polymer blend. Thus, none of the feed components are free to migrate or sweat. In contrast, the oils used in V and VI contain naphthenic components which are believed to lack complete compatability with the addition polymers, thus probably being present, partially at least, as heterogenous components of the beads formed in IV and V. A second blend was prepared exactly as above except a jet fuel (JP–4) was substituted for the kerosene and substantially the same product resulted.

The invention having thus been described, I claim:

1. A method for forming solid particles of a meltable substance, which comprises:
   introducing a bulk quantity of said meltable substance in a molten state into a nonsolvent liquid devoid of colloidal stabilizer maintained at a temperature above the solidification temperature of said meltable substance;
   agitating the mixture of molten susbtance and nonsolvent liquid to form a non-stable dispersion of discrete droplets of said molten substance in said nonsolvent liquid; and
   cooling said dispersion to solidify said discrete droplets and thereby form solid particles of said substance while maintaining said droplets dispersed in said nonsolvent liquid.

2. The method defined in claim 1 wherein said nonsolvent liquid has finely divided solids dispersed therein, said finely divided solids being substantially insoluble in said nonsolvent liquid and being substantially insoluble in said molten substance.

3. The method defined in claim 1 wherein said meltable substance is a blend of wax and polymer.

4. The method defined in claim 1 wherein said nonsolvent liquid is an aqueous liquid.

5. The method defined in claim 1 wherein said dispersion is cooled by admixture with an additional volume of cold nonsolvent liquid.

6. The method defined in claim 1 including the additional steps of recovering said solid particles from said nonsolvent liquid and drying said recovered solid particles.

7. A method for producing substantially spheroidal solid particles of a meltable substance, which comprises:
   passing a nonsolvent liquid devoid of colloidal stabilizer at a temperature above the solidification temperature of said meltable substance through a conduit;
   injecting said meltable substance in a molten state into said nonsolvent liquid through an injection nozzle projecting into said conduit at an acute angle from the axis of said conduit whereby said meltable substance has a velocity component in the direction of flow of the nonsolvent liquid;
   maintaining the velocity of the nonsolvent liquid passing through said conduit sufficient to shear said meltable substance from the injection nozzle in small droplets so as to form a non-stable dispersion of discrete droplets of said meltable substance in said nonsolvent liquid;
   passing said dispersion into a relatively quiescent zone wherein the velocity of said nonsolvent liquid is reduced; and
   cooling said dispersion to solidify said discrete droplets while maintaining said droplets dispersed in said nonsolvent liquid so as to thereby form substantially spheroidal solid particles of said meltable substance.

8. The method defined in claim 7 wherein said nonsolvent liquid is flowing within a horizontal conduit and wherein said molten substance is injected upwardly into said horizontally flowing nonsolvent liquid at an acute angle of between 15 and 75 degrees.

9. The method defined in claim 7 wherein said dispersion is passed upwardly through said quiescent zone.

10. The method defined in claim 7 wherein said dispersion is cooled by admixture with an additional volume of cold nonsolvent liquid.

11. The method defined in claim 10 wherein a portion of said cold nonsolvent liquid is injected tangentially into an upper section of said quiescent zone.

12. A process as defined in claim 7 including the additional steps of recovering said solid particles of said substance from said nonsolvent liquid and drying said recovered solid particles.

13. A process as defined in claim 7 wherein said nonsolvent liquid has finely divided solids dispersed therein, said finely divided solids being substantially insoluble in said nonsolvent liquid and being substantially insoluble in said meltable substance.

14. The method defined in claim 7 wherein said meltable substance is a blend of wax and polymer.

15. The method defined in claim 7 wherein said nonsolvent liquid is an aqueous liquid.

16. A method for producing substantially spheroidal solid particles of wax-polymer composition, which comprises:
   passing an aqueous liquid devoid of colloidal stabilizer at a temperature above the solidification temperature of the wax-polymer composition through a horizontal conduit;
   injecting said wax-polymer composition in a molten state through an injection nozzle projecting upwardly into said conduit at an angle of between 15° and about 75° from the axis of said conduit whereby said injected wax-polymer composition has a velocity component in the direction of flow of the nonsolvent liquid;
   maintaining the velocity of the aqueous liquid passing through said conduit sufficient to shear said waxployment composition from the injection nozzle in small droplets so as to form a non-stable dispersion of discrete droplets of said wax-ployer composition in said aqueous liquid;

passing said dispersion into a relatively quiescent zone wherein the velocity of said aqueous liquid is reduced; and cooling said dispersion to solidify said discrete droplets while maintaining said droplets dispersed in said aqueous liquid so as to thereby form substantially spheroidal solid particles of said wax-polymer composition.

References Cited

UNITED STATES PATENTS

| | | | |
|---|---|---|---|
| 1,306,060 | 6/1919 | Hall | 264—14 |
| 1,378,084 | 5/1921 | Bacon et al. | 264—13 |
| 2,652,386 | 9/1953 | Wallman | 264—4 |
| 3,042,970 | 7/1962 | Terenzi | 264—11 |
| 3,334,159 | 8/1967 | Campbell | 264—13 |

FOREIGN PATENTS 715,099   9/1954   England.

ROBERT F. WHITE, Primary Examiner

J. R. HALL, Assistant Examiner